US012811659B2

(12) United States Patent
Khoshnevisan et al.

(10) Patent No.: US 12,811,659 B2
(45) Date of Patent: Nov. 24, 2026

(54) ENHANCED GROUP-BASED BEAM REPORT FOR STXMP

(71) Applicant: QUALCOMM Incorporated, San Diego, CA (US)

(72) Inventors: Mostafa Khoshnevisan, San Diego, CA (US); Yan Zhou, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 18/472,882

(22) Filed: Sep. 22, 2023

(65) Prior Publication Data

US 2024/0146383 A1 May 2, 2024

Related U.S. Application Data

(60) Provisional application No. 63/381,277, filed on Oct. 27, 2022.

(51) Int. Cl.
*H04B 7/06* (2006.01)

(52) U.S. Cl.
CPC .................................. *H04B 7/0696* (2023.05)

(58) Field of Classification Search
CPC .................................................... H04B 7/0696
See application file for complete search history.

(56) References Cited

U.S. PATENT DOCUMENTS

2016/0353424 A1* 12/2016 Stirling-Gallacher ........................ H04B 7/0626
2024/0154667 A1* 5/2024 Matsumura ........... H04L 5/0051
2025/0287243 A1* 9/2025 Zhang ................ H04B 7/06956
2026/0031884 A1* 1/2026 Gao ..................... H04B 7/0626
2026/0045991 A1* 2/2026 Kang ................... H04B 7/0626

FOREIGN PATENT DOCUMENTS

WO WO-2017028676 A1 * 2/2017 ............. H04B 7/088

OTHER PUBLICATIONS

International Search Report and Written Opinion—PCT/US2023/074965—ISA/EPO—Jan. 26, 2024.

(Continued)

*Primary Examiner* — Derrick V Rose
(74) *Attorney, Agent, or Firm* — Norton Rose Fulbright US LLP

(57) ABSTRACT

This disclosure provides systems, methods, and devices for wireless communication that support improved beam reporting with reduced overhead for beam pairs that can both transmit and receive data. A user equipment (UE) may determine a one or more beam pairs available for wireless communication and may determine transmitting capabilities and receiving capabilities of the one or more beam pairs. The UE may determine, based on the transmitting capabilities and receiving capabilities, control information that identifies the one or more beam pairs. The control information may identify at least one of the one or more beam pairs as capable of both transmitting and receiving data. The UE may transmit the control information to a base station. Other aspects and features are also claimed and described.

30 Claims, 9 Drawing Sheets

(56) References Cited

OTHER PUBLICATIONS

NTT DOCOMO Inc: "Discussion on Unified TCI Framework Extension for Multi -TRP", 3GPP TSG RAN WG1 #110, R1-2207393, 3rd Generation Partnership Project, Mobile Competence Centre, 650, Route Des Lucioles F-06921, Sophia-Antipolis Cedex, France, vol. RAN WG1, No. Toulouse, France, Aug. 22, 2022-Aug. 26, 2022, Aug. 12, 2022, 11 Pages, XP052275328, Section 4, p. 9-p. 10.
Qualcomm Incorporated: "Simultaneous Multi-panel Transmission", 3GPP TSG-RAN WG1 Meeting #110-bis-e, R1-2209972, 3rd Generation Partnership Project, Mobile Competence Centre, 650, Route Des Lucioles, F-06921 Sophia-Antipolis Cedex, France, vol. RAN WG1, No. e-Meeting; Oct. 10, 2022-Oct. 19, 2022 Sep. 30, 2022, 18 Pages, XP052259444, Section 6, proposal 14 and paragraph above, p. 14.
VIVO: "Views on Unified TCI Framework Extension for Multi-TRP", 3GPP TSG RAN WG1 #109- e, R1-2203541,3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 20 Pages, XP052153016, Section 2.7.1, p. 12-p. 14.

* cited by examiner

ENHANCED GROUP-BASED BEAM REPORT FOR STXMP

CROSS-REFERENCE TO RELATED APPLICATIONS

This application claims the benefit of U.S. Provisional Patent Application No. 63/381,277, entitled, "ENHANCED GROUP-BASED REPORT FOR STXMP," filed on Oct. 27, 2022, which is expressly incorporated by reference herein in its entirety.

TECHNICAL FIELD

Aspects of the present disclosure relate generally to wireless communication systems, and more particularly, to beam pair reporting and selection for wireless network communication. Some features may enable and provide improved communications, including improved beam pair reporting with reduced overhead for beam pairs that can both transmit data and receive data.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications. For example, UEs and base stations may be capable of communicating using multiple wireless connections (e.g., multiple beams). Such communications may increase communicative bandwidth between UEs and base stations and may reduce latency in communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of this disclosure provide techniques for reporting of beam pairs within a wireless network, such as between user equipment (UE) and base station (BS) or UE and UE. The reporting may indicate beam pairs that are capable of both transmitting and receiving data, which provides efficient reporting of capabilities for beam pairs. The efficiency may be obtained by reducing the overall communication overhead required for beam pair-capable UEs and BSs to coordinate communications that use beam pairs (e.g., for L1 beam reports). Further, these techniques may be combined with configurable signal information reporting, which may be used to assist in selecting between available beam pairs for communication.

In one aspect, a method of wireless communication performed by a user equipment (UE) is provided that includes determining one or more beam pairs available for wireless communication; determining one or more transmitting capabilities of the one or more beam pairs and one or more receiving capabilities of the one or more beam pairs; determining, based on the transmitting capabilities and the receiving capabilities, control information that identifies the one or more beam pairs, wherein the control information identifies at least one of the one or more beam pairs as capable of both transmitting and receiving data; and transmitting the control information to a base station.

In another aspect, a method of wireless communication performed by a base station is provided that includes receiving control information from a user equipment device (UE) that identifies one or more beam pairs for use in communicating with the UE; determining one or more beam pairs identified by the control information; determining a first beam pair from among the one or more beam pairs, wherein the first beam pair is capable of both transmitting and receiving data; and communicating with the UE using the first beam pair.

In another aspect, a user equipment (UE) is provided that includes a memory storing processor-readable code; and at least one processor coupled to the memory. The at least one processor may be configured to execute the processor-readable code to cause the at least one processor to determine one or more beam pairs available for wireless communication by the UE; determine one or more transmitting capabilities of the one or more beam pairs and one or more receiving capabilities of the one or more beam pairs; determine, based on the transmitting capabilities and the receiving capabilities, control information that identifies the one or more beam pairs, wherein the control information identifies at least one of the one or more beam pairs as capable of both transmitting and receiving data; and transmit the control information to a base station.

In another aspect, a base station is provided that includes a memory storing processor-readable code and at least one processor coupled to the memory. The at least one processor may be configured to execute the processor-readable code to cause the at least one processor to receive control information from a user equipment device (UE) that identifies one or more beam pairs for use in communicating with the UE; determine one or more beam pairs identified by the control information; determine a first beam pair from among the one or more beam pairs, wherein the first beam pair is capable of both transmitting and receiving data; and communicate with the UE using the first beam pair.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
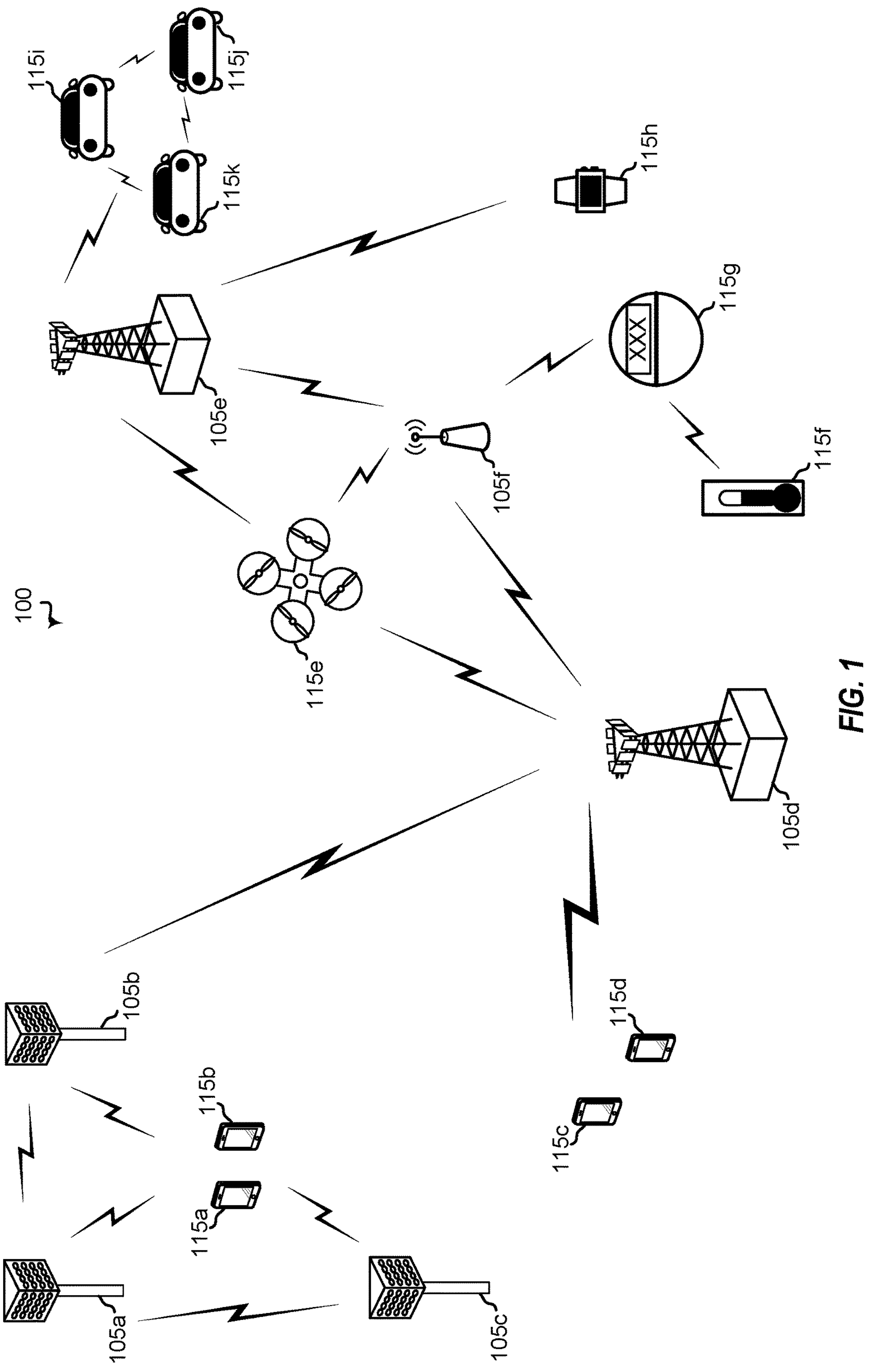
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support improved beam pair reporting and coordination between UEs and base stations. In particular, the present disclosure provides techniques that enable reduced communicative overhead to report beam pairs, and in particular to report beam pairs that can both transmit and receive data.

Particular implementations of the subject matter described in this disclosure may be implemented to realize one or more of the following potential advantages or benefits. In some aspects, the present disclosure provides techniques for improved reporting of beam capabilities in wireless communications, and in particular with wireless communications according to the 5G standard. In some aspects, the present techniques describe improved ways to report capability information for identified beam pairs such that the capability information is able to efficiently indicate which beam pairs are capable of both transmitting data and receiving data. The described techniques may not rely on separate reporting or separate indications to indicate transmitting capabilities and receiving capabilities. This reduces communication overhead, reducing the communicative bandwidth to coordinate beam-based communication between UEs and base stations. This can improve configuration time, reliability, and overall communication bandwidth within a network (e.g., a 5G wireless communication network). In some aspects, the control information is able to comply with the decoding requirements of, e.g., a base station, enabling seamless integration with existing beam-capable communication hardware. In certain implementations, these techniques may also be dynamically configured to ensure that the beam reporting overhead stays at a desired, predetermined size. Further, the provided techniques are configurable to include signal information, which may improve communication selection and reporting.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wide-band-CDMA (W-CDMA) and low chip rate (LCR). CDMA2000 covers IS-2000, IS-95, and IS-856 standards.

A TDMA network may, for example, implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.). Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of Things" (IoT) or "Internet of Everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
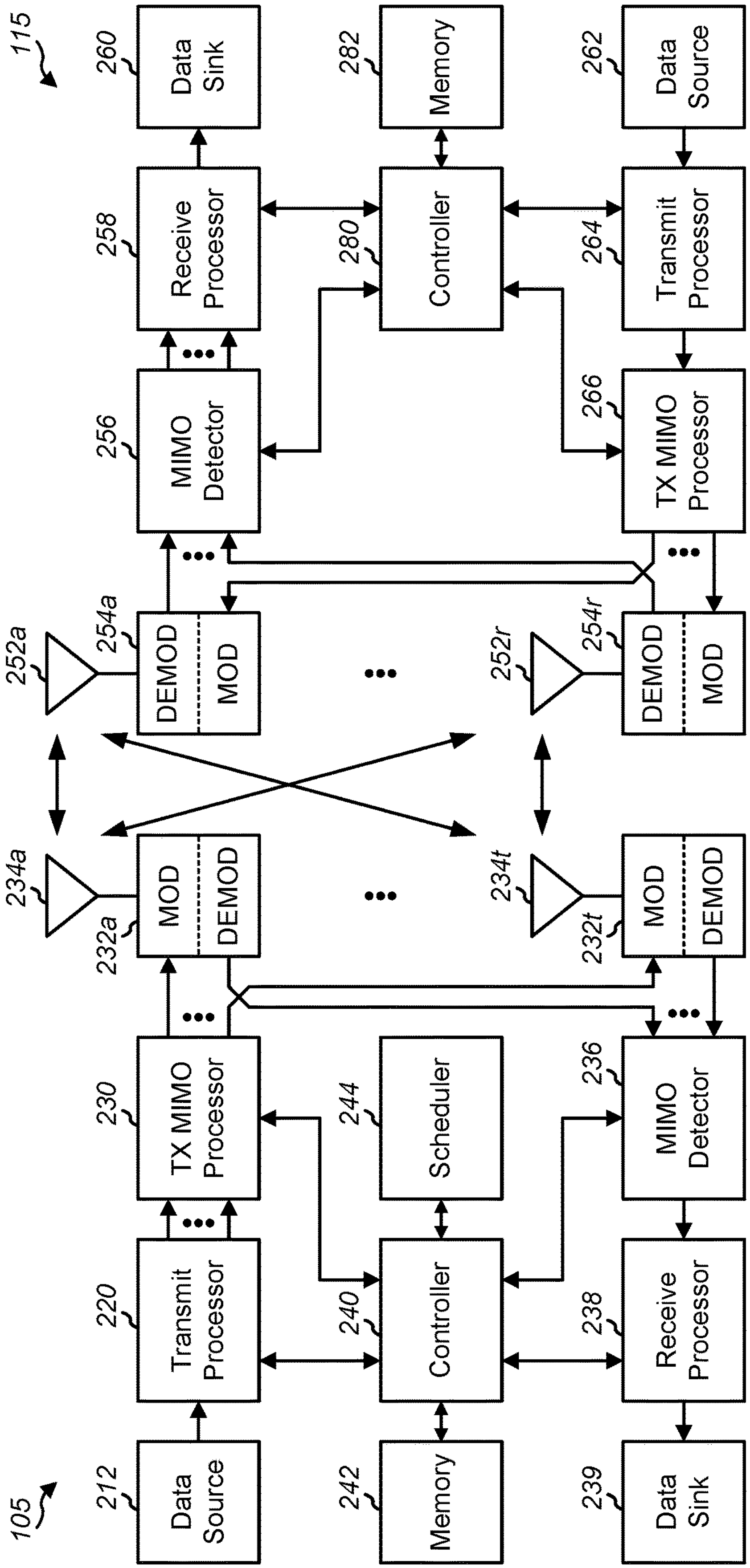
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5 and 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
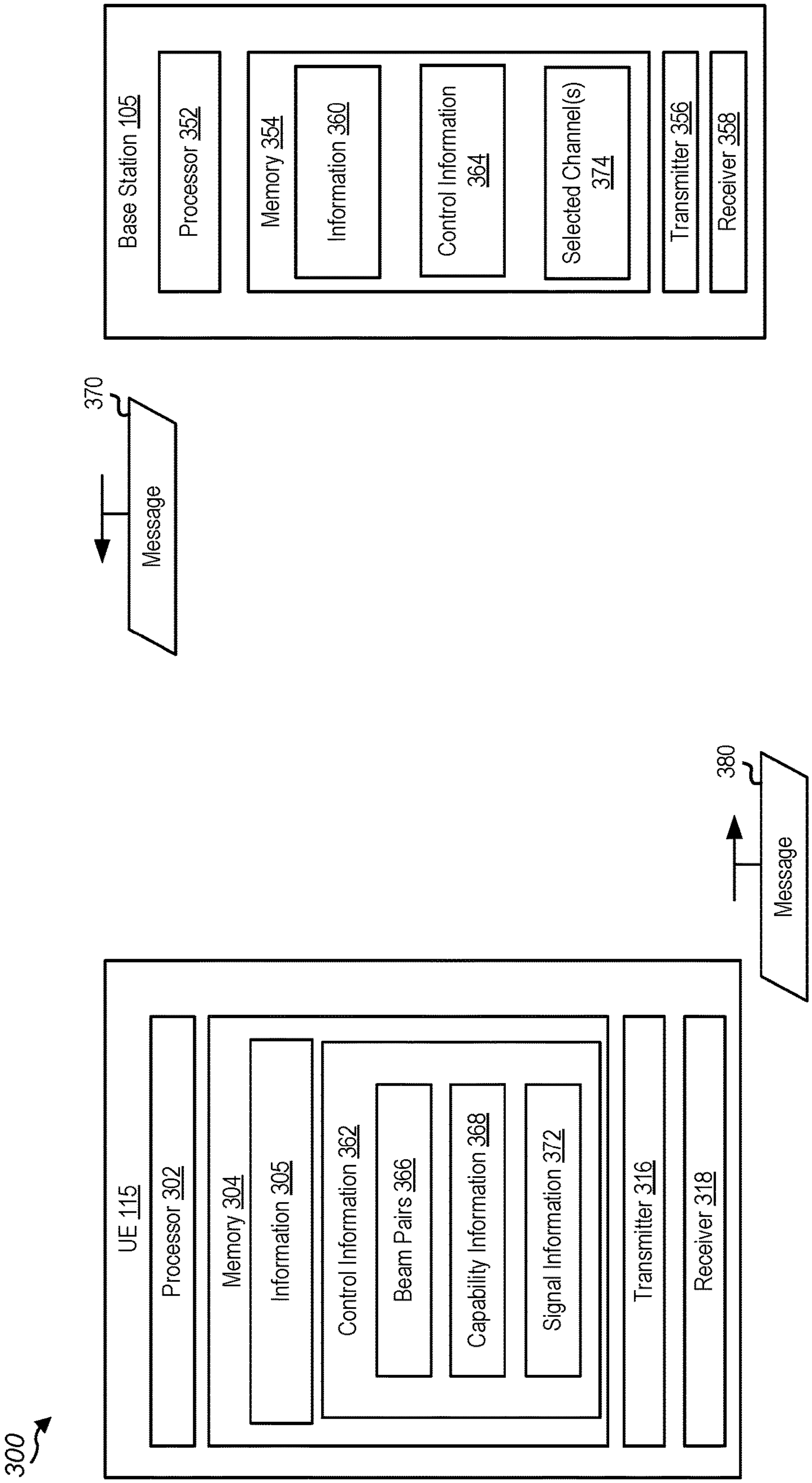
FIG. 3 is a block diagram of an example wireless communications system that supports efficient and combined reporting of beam pairs that are capable of both transmitting and receiving data according to one or more aspects.

FIG. 3 is a block diagram of an example wireless communications system 300 that supports efficient and combined reporting of beam pairs that are capable of both transmitting and receiving data according to one or more aspects. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store control information 362, which includes beam pairs 366, capability information 368, and signal information 372. Transmitter 316 is configured to transmit reference signals, control information and data to one or more other devices, and receiver 318 is configured to receive reference signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store control information 364 and one or more selected channel(s) 374. The control information 364 may be a received copy of the control information 362 and the selected channel(s) 374 may represent one or more channels selected for communication between the UE 115 and the base station 105. Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, the UE 115 may be configured to determine one or more beam pairs 366 available for wireless communication with the UE 115. In certain implementations, beam pairs may include collections of two or more beams (e.g., beams from the base station 105 or other base stations) accessible to the UE 115 for communication. Beams may include directed transmissions from one or more base stations and may have directional and/or frequency components. For example, the beams may be identified as beams used to communicate according to the 5G-NR Rel-15/16 Standard from 3GPP. Certain beams may be capable of communication in one direction (e.g., either transmitting data from the UE 115, receiving data at the UE 115), while other beams may be capable of communication in multiple directions (e.g., both sending and receiving data). The UE 115 may additionally identify available beams from one or more base stations 105 in communicative range of the UE 115 (e.g., by scanning for or otherwise sensing the beans, by querying the base stations 105). The UE 115 may then determine beam pairs 366 based on the identified beams. For example, beam pairs 366 may be selected such that each beam may be from a different transmission and reception point (TRP) (e.g., different TRPs on the same base station 105, different TRPs on different base stations 105). In certain implementations, when identified, the beams may be clustered into channel management resources (CMRs) of a CMR set that correspond to each available TRP, and the UE 115 may select one beam or one CMR from each CMR set. In certain implementations, clustering of beams may be configurable by the UE 115 and/or base station 105, such as by configuring two or more CMR sets. In addition, the UE 115 may be configured with multiple beam pairs to report, such as according to a nrofReportedGroups setting). In such instances, each reported beam pair may correspond to one CMR in the first CMR set and another CMR in the second CMR set.

The UE 115 may be configured to determine transmitting capabilities of the beam pairs 366 and receiving capabilities of the beam pairs 366. In certain implementations, transmitting capabilities may include enabling the UE 115 to transmit data via one or more beams within a beam pair 366. In certain implementations, receiving capabilities may include enabling the UE 115 to receive data via a beam pair 366. Individual transmitting capabilities and receiving capabilities may be determined for each of at least a subset of the beam pairs 366 (e.g., for each individual beam pair). Certain beam pairs 366 may only include transmitting capabilities, certain beam pairs 366 may only include receiving capabilities, and certain beam pairs 366 may include both transmitting capabilities and receiving capabilities.

The UE 115 may be configured to determine, based on the transmitting capabilities and receiving capabilities, control information 362 that identifies the plurality of beam pairs 366. In particular, the control information 362 may indicate that at least one of the beam pairs 366 is capable of both transmitting and receiving data. In certain implementations, the control information 362 identifies one or more resource sets for use in communicating with the UE 115. In particular, the control information 362 may identify multiple CMRs for use in a communicative link between the UE 115 and the base station 105 (and/or other base stations). In certain implementations, for example, the control information 362, 364, 400, 430 may identify channel state information reference signal (CSI-RS) and/or synchronization signal block (SSB) resources for use in communicating with the UE 115. In certain implementations, each of the beam pairs 366 is identified within the control information 362 by two or more CSI-RS resource indicators (CRIs) and/or SSB resource indicators (SSBRIs) that correspond to the two or more beams included within the beam pair. For example, corresponding CRIs and/or SSBRIs may be indicated by index within each CMR set included within the control information 362, 400, 430. That is, the UE 115 may indicate a beam of a beam pair 366 by indicating CRI and/or SSBRI of the beam, which may serve as an index within a corresponding CMR set for the beam pair 366, such as where a first beam of the beam pair 366 is from the first CMR set, and a second beam of the beam pair 366 is from the second CMR set.

In particular, the control information 362 may be implemented as channel state information (CSI), uplink control information (UCI), and/or an L1 beam report (for L1 group-based beam reporting). In such implementations, where certain beam pairs 366 have both transmitting capabilities and receiving capabilities, the transmitting capabilities and receiving capabilities may typically need to be separately reported (e.g., according to 5G-NR Rel-15/16/18 Standards from 3GPP). This can require extensive and unnecessary overhead in communications between the UE 115 and base station 105. Accordingly, efficient techniques for reporting beam pairs that can both transmit and receive data are needed.

Figure 4A:
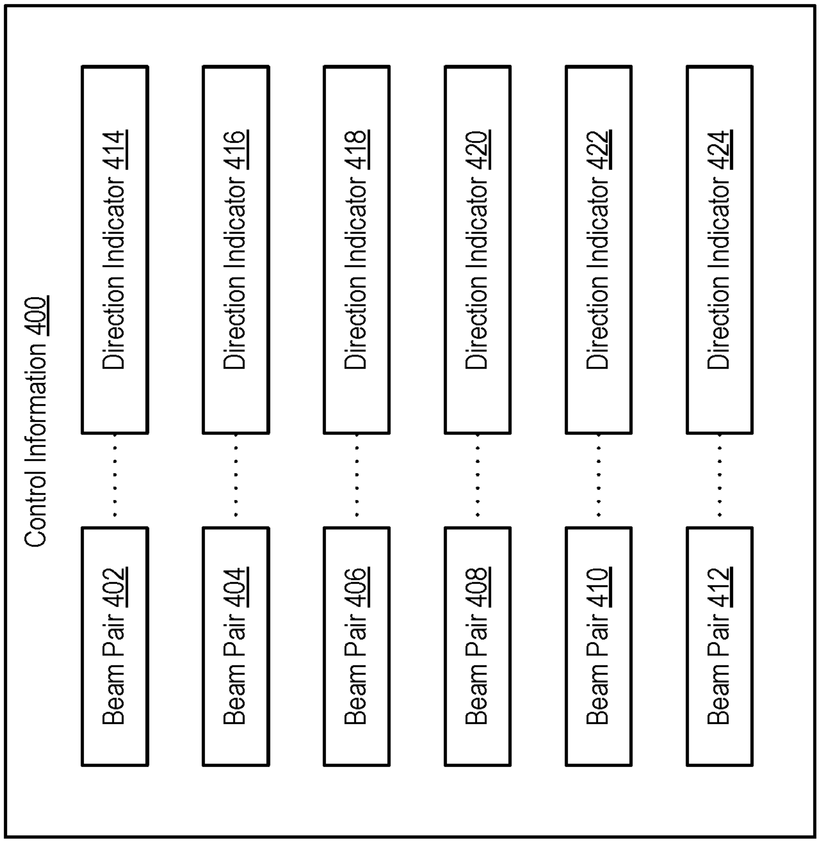
FIGS. 4A-4B depict control information according to exemplary embodiments of the present disclosure.

To indicate the transmitting capabilities and receiving capabilities of the beam pairs, the control information 362 includes capability information 368. In certain implementations, the control information 362 (e.g., the capability information 368) may include, for at least a subset of the plurality of beam pairs 366, corresponding direction indicators that indicate transmitting and/or receiving capabilities of corresponding beam pairs 366. For example, FIG. 4A depicts control information 400 according to an exemplary embodiment of the present disclosure. The control information 400 may be an exemplary implementation of the control information 362. The control information 400 includes beam pairs 402, 404, 406, 408, 410, 412 and corresponding direction indicators 414, 416, 418, 420, 422, 424. In certain implementations, the direction indicators 414, 416, 418, 420, 422, 424 may indicate whether corresponding beam pairs 366 are capable of transmitting data, receiving data, and/or both. In certain implementations, the direction indicators 414, 416, 418, 420, 422, 424 may include a one-bit indicator that identifies between two potential transmitting and receiving capabilities. For example, a value of '1' may indicate that the corresponding beam pair 402, 404, 406, 408, 410, 412 is only capable of transmitting data and a value of '0' may indicate that the corresponding beam pair 402, 404, 406, 408, 410, 412 is capable of both transmitting and receiving data. In certain implementations, the direction indicators 414, 416, 418, 420, 422, 424 may include a two-bit indicator that identifies between three or more potential transmitting and receiving capabilities. For example, a value of '00' may indicate that the corresponding beam pair 402, 404, 406, 408, 410, 412 is only capable of transmitting data, a value of '01' may indicate that the corresponding beam pair 402, 404, 406, 408, 410, 412 is only capable of receiving data, and a value of '10' may indicate that the corresponding beam pair 402, 404, 406, 408, 410, 412 is capable of both transmitting and receiving data.

In certain implementations, each of at least a subset of the plurality of direction indicators 414, 416, 418, 420, 422, 424 may correspond to individual beam pairs 402, 404, 406, 408, 410, 412. For example, each beam pair 402, 404, 406, 408, 410, 412 may be sequentially followed within the control information 362 by a corresponding direction indicator 414, 416, 418, 420, 422, 424. For example, the control information 400 may include CRIs/SSBRIs for each of the beams in the beam pair 402, followed by the direction indicator 414 for the beam pair 402, which is then followed by the CRIs/SSBRIs for the beam pair 404, the direction indicator 416, and so on, as shown below in Table 1. Although different orderings of the data are possible in different aspects of the information.

TABLE 1

| Exemplary control information 400<br>Control Information 400 |
|---|
| CRI/SSBRI for beam 1 of beam pair 402 |
| CRI/SSBRI for beam 2 of beam pair 402 |
| Direction Indicator 414 |
| CRI/SSBRI for beam 1 of beam pair 404 |
| CRI/SSBRI for beam 2 of beam pair 404 |
| Direction Indicator 416 |
| CRI/SSBRI for beam 1 of beam pair 406 |
| CRI/SSBRI for beam 2 of beam pair 406 |
| Direction Indicator 418 |
| . . . |

In further implementations (not depicted in FIG. 4A), certain direction indicators correspond to multiple beam pairs 402, 404, 406, 408, 410, 412. For example, a single direction indicator may be included that corresponds to all of the beam pairs 402, 404, 406, 408, 410, 412. For example, the single direction indicator may occur at a predetermined position within the control information 400 (e.g., before identifying information for the beam pairs 402, 404, 406, 408, 410, 412, after identifying information for the beam pairs 402, 404, 406, 408, 410, 412, between identifying information for the beam pairs 402, 404, 406, 408, 410, 412) that indicates capabilities for all of the beam pairs 402, 404, 406, 408, 410, 412.

In still further implementations, individual direction indicators may correspond to a subset of the beam pairs 366, 402, 404, 406, 408, 410, 412. For example, a single direction indicator 414, 416, 418, 420, 422, 424 may be included in the control information 362, 364, 400, 430 (e.g., after identifying information for the corresponding beam pairs 366, 402, 404, 406, 408, 410, 412) that indicates capabilities for all preceding beam pairs. For example, the control information 400 may include consecutive CRIs/SSBRIs for the beam pairs 402, 404, 406 and may omit the direction indicators 414, 416. After the CRIs/SSBRIs for the beam pair 406, the control information may include the direction indicator 418, which may indicate transmitting and/or receiving capabilities for the preceding beam pairs 402, 404, 406. In such implementations, the direction indicators 414, 416, 418, 420, 422, 424 may be reported in separate categories. For example, beam pairs 402, 404, 406, 408, 410, 412 that can both transmit and receive data may initially be included at the beginning of the control information 400, followed by beam pairs 402, 404, 406, 408, 410, 412 that can only transmit data, followed by beam pairs 366, 402, 404, 406, 408, 410, 412 that can only receive data. After each category of beam pairs 402, 404, 406, 408, 410, 412, a corresponding direction indicator 414, 416, 418, 420, 422, 424 may be included that separates consecutive categories and indicates the capabilities of the beam pairs 402, 404, 406, 408, 410, 412 in the preceding categories.

In certain implementations, different types of direction indicators 414, 416, 418, 420, 422, 424 may be combined within the same control information 400. For example, certain implementations of the control information may include one or more direction indicators that correspond to multiple beam pairs and one or more direction indicators that correspond to single beam pairs.

In certain implementations, the control information 400 may also include one or more capability indexes for the beam pairs 402, 404, 406, 408, 410, 412. The capability indexes may indicate a number of ports available for use by corresponding beams of the beam pairs 402, 404, 406, 408, 410, 412. For example, the capability indexes may indicate a number of sounding reference signal (SRS) ports that a beam can or will use for communication. As another example, the capability indexes may indicate a number of physical layers (such as PUSCH layers) that a beam can or will use for communication. In certain implementations, capability indexes may be included for all of the beam pairs 402, 404, 406, 408, 410, 412 (such as for each beam of each of the beam pairs 402, 404, 406, 408, 410, 412).

In additional or alternative implementations, capability indexes may only be included for a subset of the beam pairs 402, 404, 406, 408, 410, 412. For example, capability indexes may only be included for a predetermined quantity of the plurality of beam pairs 402, 404, 406, 408, 410, 412. For example, a predetermined (e.g., configurable) quantity (M) may be specified to indicate how many beam pairs 402, 404, 406, 408, 410, 412 will include corresponding capability indexes. The quantity M may be predetermined for the UE based on a configuration received from the BS, such as in a Radio Resource Control (RRC) message.

In certain instances, M may be less than the total quantity (N) of beam pairs 402, 404, 406, 408, 410, 412 included within the control information 400 (e.g., M<N). As a specific example, in FIG. 4A, the control information 400 includes N=6 beam pairs 402, 404, 406, 408, 410, 412. If M=2, then the control information 400 would only include capability indexes for the first 2 beam pairs 402, 404. In certain implementation, where only a predetermined number of capability indexes are included, capability indexes may only be included for beam pairs 402, 404, 406, 408, 410, 412 that can be transmitted simultaneously within the beam pair (e.g., for which the direction indicator indicates that the beam pair can be either transmitted simultaneously, or can be both transmitted simultaneously and received simultaneously). In such instances, if the quantity of beam pairs 402, 404, 406, 408, 410, 412 that can be transmitted simultaneously within the beam pair is greater than M, the control information may only include capability indexes for the first M beam pairs 402, 404, 406, 408, 410, 412 that can be transmitted simultaneously within the beam pair. As a specific example, if M=2, but 3 beam pairs 402, 406, 408 be transmitted simultaneously within the beam pair, the capability information may only include capability indexes for the first two beam pairs 402, 406 that can transmit and receive data and may omit capability indexes for the remaining beam pairs 404, 408, 410, 412.

In certain instances, the capability indexes may be appended after identifying information for the beam pairs 402, 404, 406, 408, 410, 412, as shown in Table 2 below. If the number of beam pairs 402, 404, 406, 408, 410, 412 that can be transmitted simultaneously is less than M, the control information 400 may include capability indexes for all beam pairs 402, 404, 406, 408, 410, 412 that can be transmitted simultaneously, and the remaining capability indexes may be set to 0 or NULL, or may not be included in the control information.

TABLE 2

| Exemplary control information 400<br>Control Information 400 |
|---|
| CRI/SSBRI for beam 1 of beam pair 402 |
| CRI/SSBRI for beam 2 of beam pair 402 |
| Direction Indicator 414 |
| CRI/SSBRI for beam 1 of beam pair 404 |
| CRI/SSBRI for beam 2 of beam pair 404 |
| Direction Indicator 416 |
| CRI/SSBRI for beam 1 of beam pair 406 |
| CRI/SSBRI for beam 2 of beam pair 406 |
| Direction Indicator 418 |

TABLE 2-continued

| Exemplary control information 400<br>Control Information 400 |
|---|
| CRI/SSBRI for beam 1 of beam pair 408 |
| CRI/SSBRI for beam 2 of beam pair 408 |
| Direction Indicator 420 |
| CRI/SSBRI for beam 1 of beam pair 410 |
| CRI/SSBRI for beam 2 of beam pair 410 |
| Direction Indicator 422 |
| CRI/SSBRI for beam 1 of beam pair 412 |
| CRI/SSBRI for beam 2 of beam pair 412 |
| Direction Indicator 424 |
| Capability Index for beam 1 of beam pair 402 |
| Capability Index for beam 2 of beam pair 402 |
| Capability Index for beam 1 of beam pair 404 |
| Capability Index for beam 2 of beam pair 404 |

In certain implementations, limiting the number of capability indexes in this way may reduce bandwidth requirements by capping the number of included capability indexes. It may thus be possible to configure a desired amount or size of overhead information required to exchange capability information for identified beam pairs, which may enable a desired amount of overhead savings and thus communicative bandwidth savings. However, such implementations may also limit the number of beam pairs that can have corresponding capability indexes reported. In certain instances, the base station 105 may also need the received capability information to be in a fixed size for proper decoding. Accordingly, by configuring the value for M on both the UE 115 and the base station 105, a fixed size for the control information 400 may be ensured, enabling the base station 105 to properly receive and decode the control information 400.

Figure 4B:
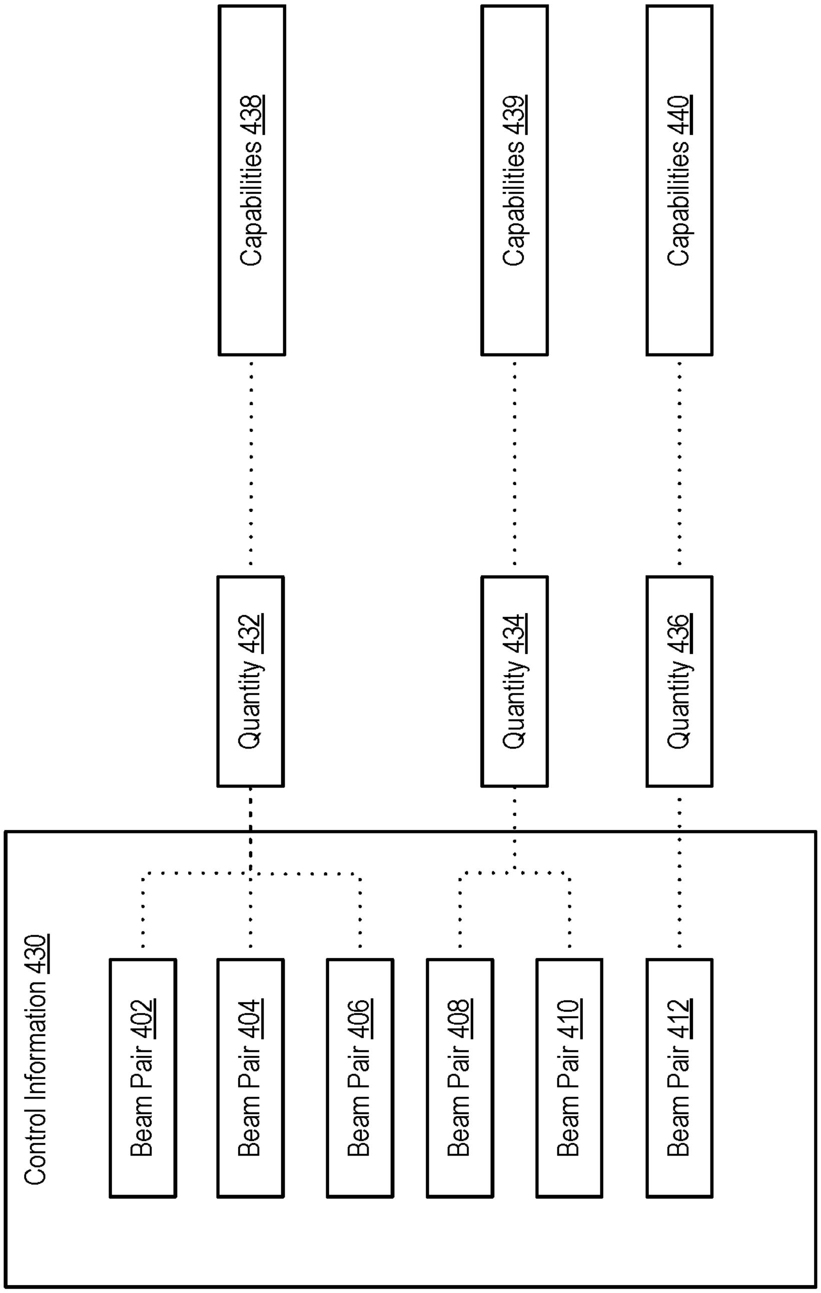

In further implementations, rather than including separate direction indicators, the control information 362 (e.g., the capability information 368) may include quantities of beam pairs 366 with predetermined transmitting and receiving capabilities. For example, FIG. 4B depicts control information 430 according to an exemplary embodiment of the present disclosure. The control information 430 may be an exemplary implementation of the control information 362. The control information 430 includes beam pairs 402, 404, 406, 408, 410, 412 with corresponding quantities 432, 434, 436. Each of the quantities 432, 434, 436 have a corresponding capability 438, 439, 440 (e.g., transmitting capability, receiving capability, both transmitting and receiving capability).

In certain implementations, the control information 430 may be determined based on a first quantity 432 that corresponds to a first capability 438 (e.g., both transmitting and receiving data), a second quantity 434 that corresponds to a second capability 439 (e.g., transmitting data), a third quantity 436 that corresponds to a third capability 440 (e.g., receiving data), or combinations thereof. These quantities 432, 434, 436 may correspond to subsets of the beam pairs 402, 404, 406, 408, 410, 412. For example, the first quantity 432 corresponds to the beam pairs 402, 404, 406, the second quantity 434 corresponds to the beam pairs 408, 410, and the third quantity corresponds to the beam pair 412. Beam pairs 402, 404, 406, 408, 410, 412 may be identified as having one of the capabilities 438, 439, 440 based on which quantity 432, 434, 436 the beam pairs 402, 404, 406, 408, 410, 412 correspond to. Accordingly, the beam pairs 402, 404, 406 are identified as having the first capability 438 (e.g., can both transmit and receive data), the beam pairs 408, 410 are identified as having the second capability 439 (e.g., can transmit data), and the beam pair 412 is identified as having the third capability 440 (e.g., can receive data).

Quantities 432, 434, 436 may be identified as corresponding to particular beam pairs 402, 404, 406, 408, 410, 412 based on the order in which the beam pairs 402, 404, 406, 408, 410, 412 are identified within the control information 430. For example, the first subset of the plurality of beam pairs 402, 404, 406 corresponding to the first quantity 432 may be identified in the control information 430 first. The second subset of the plurality of beam pairs 408, 410 corresponding to the second quantity 434 may then be identified, followed by the third subset of the plurality of beam pairs 412, as depicted. In various implementations, one skilled in the art will appreciate that the order in which the subsets are identified within the control information 430 may differ according to various implementations. For example, the quantities 432, 434, 436 may be specified by a configuration (such as an RRC configuration), and the UE 115 may determine the control information 430 to include corresponding numbers of the beam pairs. For example, the quantity 432 may be specified as 3, the quantity 434 may be specified as 2, and the quantity 436 may be specified as 1. The UE 115 may accordingly determine the control information 430 to include 3 beam pairs 402, 404, 406 that can both transmit and receive data, 2 beam pairs 408, 410 that can only transmit data, and 1 beam pair 412 that can only receive data In certain implementations, the UE 115 may be configured to comply with one or more constraints when determining the control information 362, 400, 430 (e.g., when selecting which beam pairs 366, 402, 404, 406, 408, 410, 412 to include in the control information 362, 400, 430). The constraints may identify one or more requirements (e.g., capability requirements) that need to be fulfilled by the beam pairs 366, 402, 404, 406, 408, 410, 412 identified by the control information 362, 400, 430. For example, the UE 115 may ensure that (i) at least one beam pair that can transmit data is included within the plurality of beam pairs 366 identified by the control information 362, 400, 430 and that (ii) at least one beam pair that can receive data is included within the plurality of beam pairs 366 identified by the control information 362, 400, 430. In such instances, this constraint may be fulfilled by inclusion in a single beam pair that can both transmit and receive data. Such restrictions may be predefined (e.g., by a communication standard) and/or may be configured by the network (e.g., received by the UE 115 from the base station 105).

Returning to FIG. 3, in certain implementations, the control information 362 may include signal information 372 for at least a subset of the plurality of beam pairs 366. The signal information 372 may include at least one of (i) a reference signal received power (RSRP) measurement (e.g., measured or determined by the UE 115) and/or (ii) a signal interference/noise ratio (SINR) measurement (e.g., measured or determined by the UE 115). In certain implementations, signal information 372 may be reported separately for each individual beam pair 366. In certain implementations, the number of beam pairs 366 for which signal information 372 is included may be less than the total number of beam pairs 366 within the control information 362. In particular, which beam pairs 366 include corresponding signal information 372 (and which measurements are included within the signal information 372) may be specified by a radio resource control (RRC) configuration, which may be configured by the base station or the UE 115. For example, the RRC configuration may specify that signal information 372 only be included for beam pairs 366 that receive data (e.g., beam pairs 366 that can only receive data and/or beam pairs 366 that can both receive and transmit data). As another example, the RRC configuration may specify that signal information 372 only be included for beam pairs 366 that do not have corresponding capability indexes.

In certain implementations, the control information 362 may be determined based on one or more settings for the UE 115 and/or the base station 105. For example, the control information 362 may be determined as described above to generate improved beam reports based on a groupBasedBeamReporting setting (e.g., of the 5G standard). In particular, the method may be performed if the groupBasedBeamReporting setting is set to 'enabled', 'TRUE', or a similar value.

The UE 115 may also be configured to transmit the control information 362 to a base station 105. For example, the control information 362 may be transmitted to the base station 105 in a message 380 (e.g., via the transmitter 316).

The base station 105 may be configured to receive control information 364 from the UE 115. In particular, the base station 105 may receive the message 380 and may extract the control information 364 (which may be a copy of the control information 362) from the message 380. Based on the control information 364 (e.g., based on CRIs/SSBRIs included within the control information), the base station 105 may identify the beam pairs 366 available to the UE 115 for communication with the base station 105. The base station 105 may determine a first beam pair from the beam pairs 366. In particular, if available, the base station 105 may select, from among the beam pairs 366, a first beam pair that is capable of both transmitting and receiving data. In other instances, the base station 105 may select a beam pair that can only transmit data or can only receive data. In certain instances, the base station 105 may select the first beam pair based on signal information 372 from the control information 364. For example, the base station 105 may select the first beam pair as a beam pair that can both transmit and receive data and that has the lowest SINR. The base station 105 may be configured to communicate with the UE 115 via the base station 105 using the first beam pair. In particular, the base station may establish a selected channel 374 that the base station 105 uses to communicate with the UE 115 (e.g., for future communications) via the first beam pair. In certain instances, the first beam pair may be reserved for communication with the UE 115. For example, the base station may include multiple TRPs that are each capable of multiple communication beams. The corresponding beams contained within the selected first beam pair may be reserved, or partially reserved, for communications with the UE 115.

As described with reference to FIG. 3, the present disclosure provides techniques for improved reporting of beam capabilities in wireless communications, and in particular with wireless communications according to the 5G standard. First, the capability information 368 is able to efficiently indicate which beam pairs are capable of both transmitting data and receiving data without having to separately include indications for each of the transmission capabilities and the receiving capabilities. This reduces communication overhead, reducing the communicative bandwidth necessary to coordinate beam-based communication between UEs and base stations, which may improve configuration time and overall communication bandwidth within a network (e.g., a 5G wireless communication network). Second, the various provided implementations for the control information are able to comply with the decoding requirements of, e.g., the base station 105, enabling seamless integration with existing beam-capable communication hardware. In certain implementations, these techniques may also be dynamically configured to ensure that the beam reporting overhead stays at a desired, predetermined size. Further, the provided techniques are configurable to include signal information, which may improve communication selection and reporting.

Figure 5:
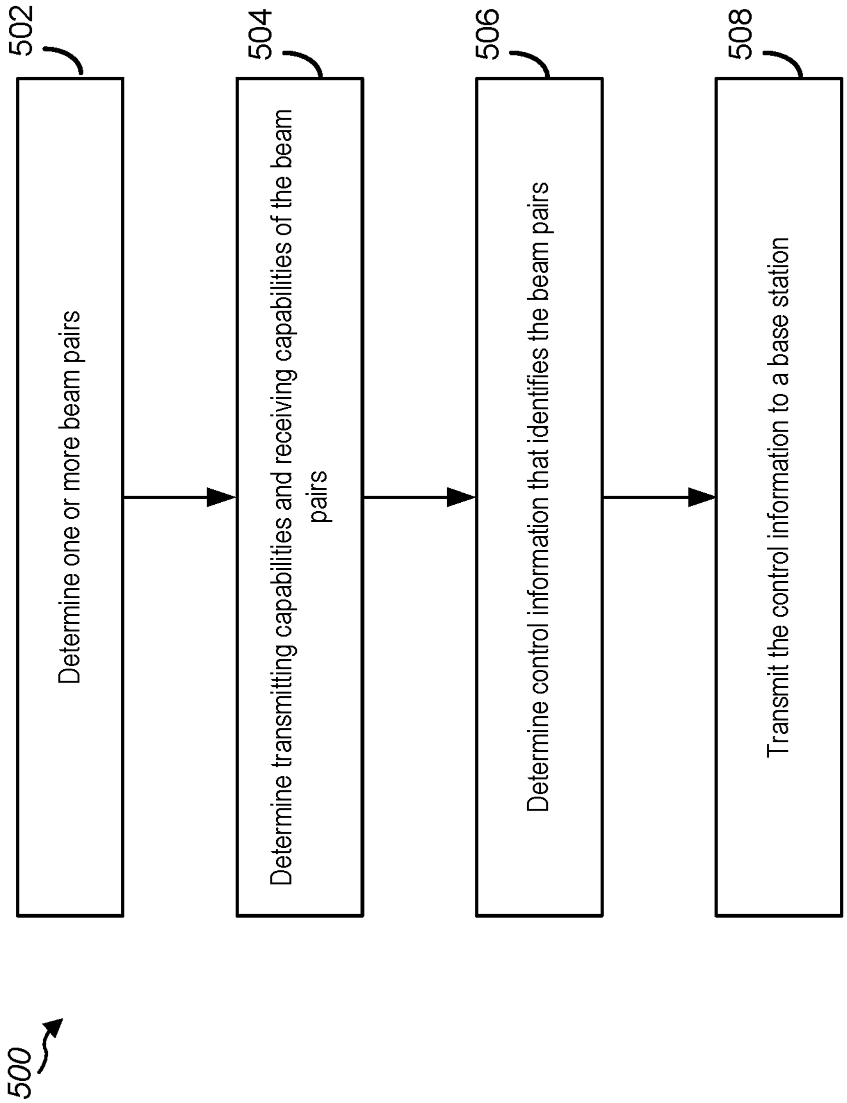
FIG. 5 is a flow diagram illustrating an example process that supports improved beam reporting according to one or more aspects.

FIG. 5 is a flow diagram illustrating an example process 500 that supports improved beam reporting according to one or more aspects. Operations of process 500 may be performed by a UE, such as UE 115 described above with reference to FIGS. 1, 2, 3, or a UE described with reference to FIG. 8. For example, example operations (also referred to as "blocks") of process 500 may enable UE 115 to support improved beam reporting with reduced overhead for beam pairs that can both transmit and receive data.

The process 500 includes determining one or more beam pairs available for wireless communication with a UE (block 502). For example, the UE 115 may determine one or more beam pairs 366, 402, 404, 406, 408, 410, 412 available for wireless communication with the UE 115 (e.g., between the UE and a base station 105). The beams may be identified based on information received from one or more base stations 105. Additionally or alternatively, the UE 115 may measure or otherwise sense one or more beams available for communication. The beams may be associated with more than one TRP, and may be received as multiple CMRs associated with the different TRPs.

The process 500 includes determining transmitting capabilities of the beam pairs and receiving capabilities of the beam pairs (block 504). For example, the UE 115 may determine transmitting capabilities of the beam pairs 366, 402, 404, 406, 408, 410, 412 and receiving capabilities of the beam pairs 366, 402, 404, 406, 408, 410, 412. Transmitting capabilities 438, 439, 440 may include enabling the UE 115 to transmit data via a beam pair 366, 402, 404, 406, 408, 410, 412. Receiving capabilities 438, 439, 440 may include enabling the UE 115 to receive data via a beam pair 366, 402, 404, 406, 408, 410, 412. Different beam pairs may include only receiving capabilities, only transmitting capabilities, or simultaneous transmitting and receiving capabilities.

The process 500 includes determining control information that identifies the plurality of beam pairs (block 506). For example, the UE 115 may determine, based on the transmitting capabilities 438, 439, 440 and receiving capabilities 438, 439, 440, control information 362, 400, 430 that identifies the plurality of beam pairs 366, 402, 404, 406, 408, 410, 412. The control information 362, 400, 430 may indicate that at least one of the beam pairs 366, 402, 404, 406, 408, 410, 412 as capable of both transmitting and receiving data. In certain implementations, the control information 362, 400, 430 identifies one or more resource sets for use in communicating with the UE 115. In particular, the control information 362, 400, 430 may include capability information 368 and/or signal information 372 for the identified beam pairs 366. As explained further above, in certain implementations, the capability information 368 may be implemented as direction indicators 414, 416, 418, 420, 422, 424 corresponding to one or more of the beam pairs 366, 402, 404, 406, 408, 410. In additional or alternative implementations, the capability information 368 may be implemented as one or more quantities 432, 434, 436 corresponding to particular types of capabilities 438, 439, 440.

The process 500 includes transmitting the control information to a base station (block 508). For example, the UE 115 may transmit the control information 362, 400, 430 to a base station 105. For example, the UE 115 may transmit the control information 362, 400, 430 as a message 380 from the UE 115 to the base station 105. The control information 362, 400, 430 may then be used to coordinate communication between the UE 115 and the base station 105 (e.g., to determine one or more selected channel(s) 374.

In certain implementations, the process 500 may be performed based on one or more settings for the UE 115. For example, the process 500 may be performed if a groupBasedBeamReporting setting of the 5G standard is set 'enabled'.

Figure 8:
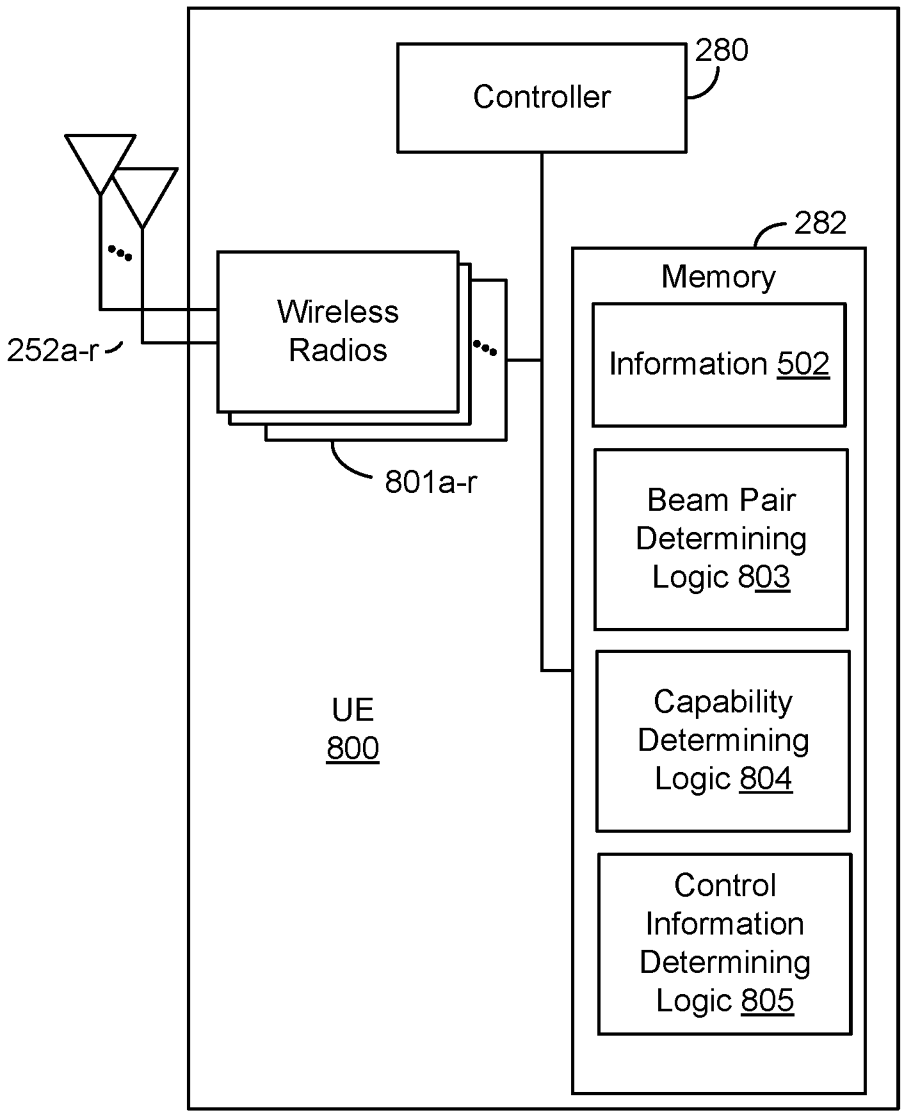
FIG. 8 is a block diagram of an example UE that supports improved beam reporting with reduced overhead for beam pairs that can both transmit and receive data to one or more aspects.

FIG. 8 is a block diagram of an example UE 800 that supports improved beam reporting with reduced overhead for beam pairs that can both transmit and receive data to one or more aspects. UE 800 may be configured to perform operations, including the blocks of a process described with reference to FIGS. 5 and 6. In some implementations, UE 800 includes the structure, hardware, and components shown and described with reference to UE 115 of FIGS. 1-3. For example, UE 800 includes controller 280, which operates to execute logic or computer instructions stored in memory 282, as well as controlling the components of UE 800 that provide the features and functionality of UE 800. UE 800, under control of controller 280, transmits and receives signals via wireless radios 701*a-r* and antennas 252*a-r*. Wireless radios 801*a-r* include various components and hardware, as illustrated in FIG. 2 for UE 115, including modulator and demodulators 254*a-r*, MIMO detector 256, receive processor 258, transmit processor 264, and TX MIMO processor 266.

Figure 7:
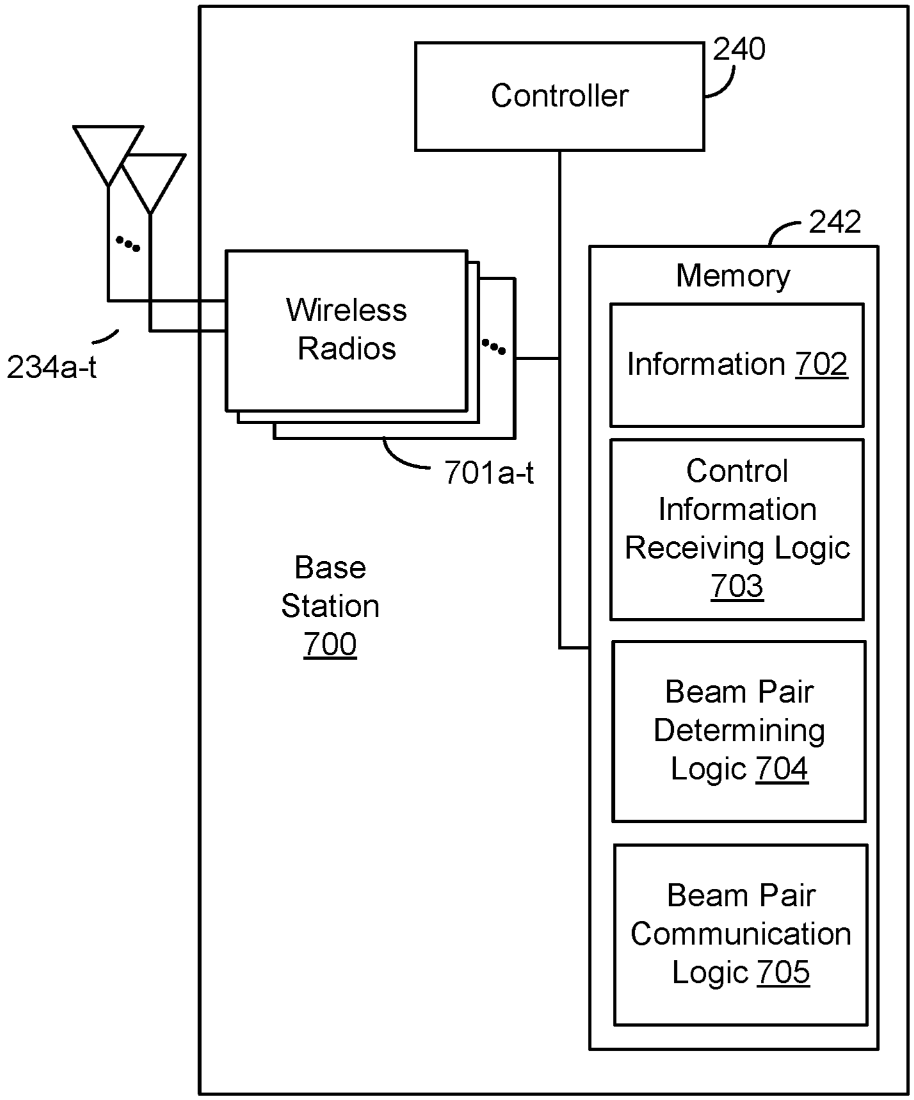
FIG. 7 is a block diagram of an example base station that supports improved beam reporting with reduced overhead for beam pairs that can both transmit and receive data according to one or more aspects.

As shown, memory 282 may include information 802, beam pair determining logic 803, capability determining logic 804, and control information determining logic 805. Information 802 may correspond to the control information 362, 400, 430. The beam pair determining logic 803 may be configured to determine one or more beam pairs 366, 402, 404, 406, 408, 410, 412 (e.g., to perform block 502 of the process 500). The capability determining logic 804 may be configured to determine transmitting capabilities and/or receiving capabilities of the beam pairs 366, 402, 404, 406, 408, 410, 412 (e.g., to perform block 504 of the process 500). The control information determining logic 805 may be configured to determine information 802 (e.g., control information 362) for the beam pairs 366, 402, 404, 406, 408, 410, 412 (e.g., to perform block 506 of the process 500). UE 800 may receive signals from or transmit signals to one or more network entities, such as base station 105 of FIGS. 1-3 or a base station as illustrated in FIG. 7. For example, the UE 800 may transmit the information 702 to a base station.

Figure 6:
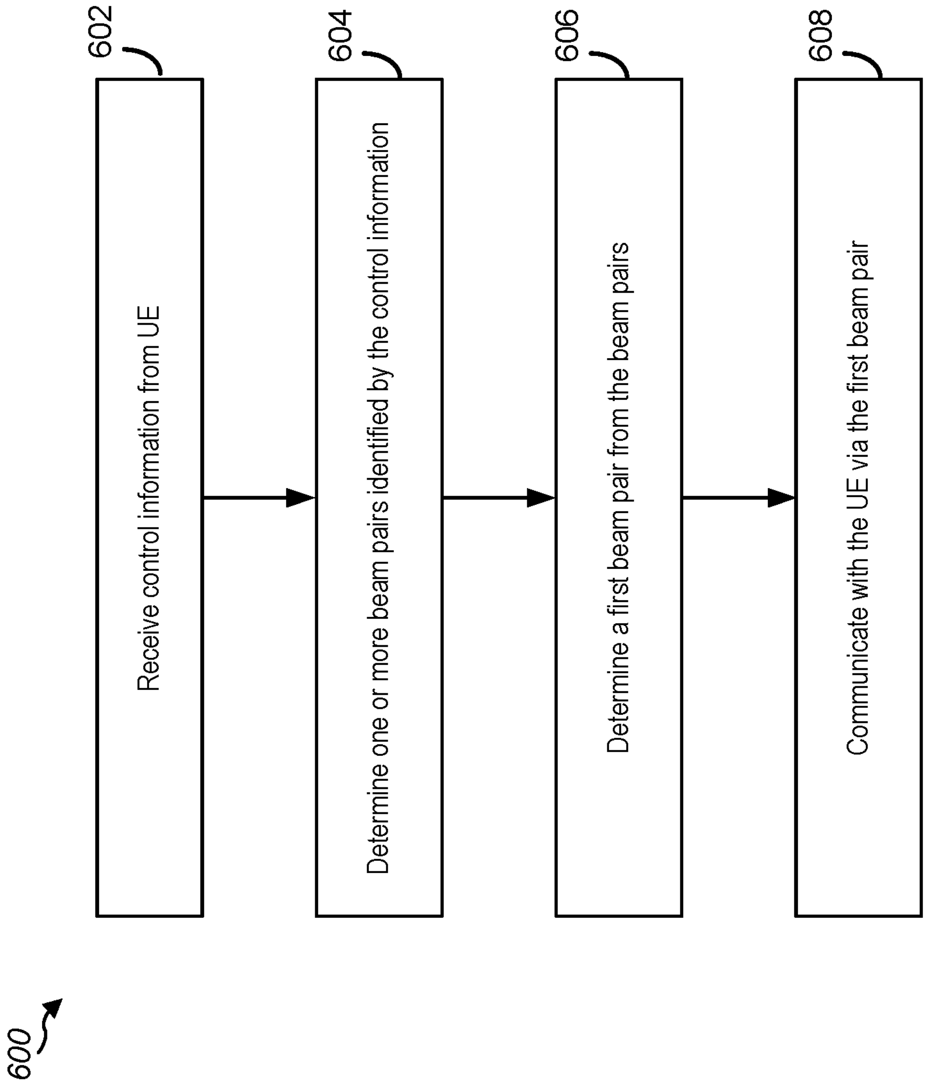
FIG. 6 is a flow diagram illustrating an example process that supports improved beam reporting with reduced overhead for beam pairs that can both transmit and receive data according to one or more aspects.

FIG. 6 is a flow diagram illustrating an example process 600 that supports improved beam reporting with reduced overhead for beam pairs that can both transmit and receive data according to one or more aspects. Operations of process 600 may be performed by a base station, such as base station 105 described above with reference to FIGS. 1-3 or a base station as described below with reference to FIG. 7. For example, example operations of process 600 may enable base station 105 to support improved beam reporting with reduced overhead for beam pairs that can both transmit and receive data.

The process 600 includes receiving control information from a UE (block 602). For example, the base station 105 may receive control information 364 from a UE 115. The control information may identify one or more beam pairs 402, 404, 406, 408, 410, 412 for use in communicating with the UE 115. In certain implementations, the control information 364 may be generated to identify beam pairs that can both transmit and receive data with reduced overhead.

The process 600 includes determining one or more beam pairs identified by the control information (block 604). For example, the base station 105 may determine one or more beam pairs 402, 404, 406, 408, 410, 412 identified by the control information 364. In certain implementations, the beam pairs 402, 404, 406, 408, 410, 412 may be identified by pairs of CRIs/SSBRIs and identifying the beam pairs 402, 404, 406, 408, 410, 412 includes extracting the CRIs/SSBRIs from the control information 364. Capability information 368 and/or signal information 372 may also be extracted that corresponds to one or more of the identified beam pairs 402, 404, 406, 408, 410, 412. For example, capability information 368 may be extracted as direction indicators 414, 416, 418, 420, 422, 424 and/or as quantities 432, 434, 436 contained within the control information 364.

The process 600 includes determining a first beam pair from among the plurality of beam pairs (block 606). For example, the base station 105 may determine a first beam pair from among the plurality of beam pairs 366. The first beam pair may be capable of both transmitting and receiving data. For example, the base station 105 may select the first beam pair based on the capability information 368 to identify a beam pair that is capable of both transmitting and receiving data. In other implementations, the selected first beam pair may only be able to transmit data and/or may only be able to receive data. In certain implementations, the base station 105 may select more than one beam pair for communication with the UE 115.

The process 600 includes communicating with the UE using the first beam pair (block 608). For example, the base station 105 may communicate with the UE 115 using the first beam pair (e.g., using one or more selected channel(s) 374 established based on the first beam pair). In particular, the UE 115 and the base station 105 may exchange messages 370, 380 via the first beam pair.

FIG. 7 is a block diagram of an example base station 700 that supports improved beam reporting with reduced overhead for beam pairs that can both transmit and receive data according to one or more aspects. Base station 700 may be configured to perform operations, including the blocks of process 600 described with reference to FIGS. 5-6. In some implementations, base station 700 includes the structure, hardware, and components shown and described with reference to base station 105 of FIGS. 1-3. For example, base station 700 may include controller 240, which operates to execute logic or computer instructions stored in memory 242, as well as controlling the components of base station 700 that provide the features and functionality of base station 700. Base station 700, under control of controller 240, transmits and receives signals via wireless radios 701*a*-*t* and antennas 734*a*-*t*. Wireless radios 701*a*-*t* include various components and hardware, as illustrated in FIG. 2 for base station 105, including modulator and demodulators 232*a*-*t*, transmit processor 220, TX MIMO processor 230, MIMO detector 236, and receive processor 238.

As shown, the memory 242 may include information 702, control information receiving logic 703, beam pair determining logic 704, and beam pair communication logic 705. The information 702 may correspond to the control information 364. The control information receiving logic 703 may be configured to receive information 702 (e.g., control information 364) from a UE 115, 800 (e.g., to perform block 602 of the process 600). Beam pair determining logic 704 may be configured to determine beam pairs identified by the control information 364 and to determine a first beam pair for communication with the UE 115, 800 (e.g., to perform blocks 604, 606 of the process 600). The beam pair communication logic 705 may be configured to communicate with the UE 115, 800 using the selected beam pair (e.g., to perform block 608 of the process 600). Base station 700 may receive signals from or transmit signals to one or more UEs, such as UE 115 of FIGS. 1-3 or UE 800 of FIG. 5.

It is noted that one or more blocks (or operations) described with reference to FIGS. 5-6 may be combined with one or more blocks (or operations) described with reference to another of the figures. For example, one or more blocks (or operations) of FIG. 5 may be combined with one or more blocks (or operations) of FIG. 6. As another example, one or more blocks associated with FIG. 6 may be combined with one or more blocks associated with FIG. 5. As another example, one or more blocks associated with FIGS. 5-6 may be combined with one or more blocks (or operations) associated with FIGS. 1-4B. Additionally, or alternatively, one or more operations described above with reference to FIGS. 1-4B may be combined with one or more operations described with reference to FIGS. 7-8.

In one or more aspects, techniques for supporting improved beam reporting with reduced overhead for beam pairs that can both transmit and receive data may include additional aspects, such as any single aspect or any combination of aspects described below or in connection with one or more other processes or devices described elsewhere herein. In a first aspect, supporting improved beam reporting with reduced overhead for beam pairs that can both transmit and receive data may include an apparatus configured to determine one or more beam pairs available for wireless communication by the UE; determine one or more transmitting capabilities of the one or more beam pairs and one or more receiving capabilities of the one or more beam pairs; determine, based on the transmitting capabilities and the receiving capabilities, control information that identifies the one or more beam pairs, wherein the control information identifies at least one of the one or more beam pairs as capable of both transmitting and receiving data; and transmit the control information to a base station. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the control information includes, for at least a subset of the one or more beam pairs, direction indicators that indicate transmitting capabilities for corresponding beam pairs and/or receiving capabilities of corresponding beam pairs.

In a third aspect, in combination with one or more of the first aspect through the second aspect, the direction indicators may include a one-bit indicator that identifies between two predetermined transmitting and receiving capabilities.

In a fourth aspect, in combination with one or more of the first aspect through the third aspect, the direction indicators include a two-bit indicator that identifies between three predetermined transmitting and receiving capabilities.

In a fifth aspect, in combination with one or more of the first aspect through the fourth aspect, each of at least a subset of the direction indicators corresponds to individual beam pairs from the one or more beam pairs.

In a sixth aspect, in combination with one or more of the first aspect through the fifth aspect, each of at least a subset of the direction indicators correspond to multiple beam pairs from the one or more beam pairs.

In a seventh aspect, in combination with one or more of the first aspect through the sixth aspect, the control information includes a capability index that identifies a quantity of ports available for each beam of a predetermined quantity of the one or more beam pairs.

In an eighth aspect, in combination with one or more of the first aspect through the seventh aspect, the control information includes quantities of beam pairs with predetermined transmitting and receiving capabilities, and the beam pairs are identified within the control information in a sequence determined based on the transmitting capabilities and the receiving capabilities.

In a ninth aspect, in combination with one or more of the first aspect through the eighth aspect, the control information is determined based on a first quantity of a first subset of the one or more beam pairs that can both transmit and receive data.

In a tenth aspect, in combination with one or more of the first aspect through the ninth aspect, the control information is determined based on at least one of (i) a second quantity of a second subset of the one or more beam pairs that can only transmit data and/or (ii) a third quantity of a third subset of the one or more beam pairs that can only receive data.

In an eleventh aspect, in combination with one or more of the first aspect through the tenth aspect, the first subset of the one or more beam pairs is identified within the control information before either or both of the second subset of the one or more beam pairs and the third subset of the one or more beam pairs.

In a twelfth aspect, in combination with one or more of the first aspect through the eleventh aspect, the control information is determined based on the first quantity and the second quantity, and the control information further includes a capability index that identifies a quantity of ports available for each beam of the first and second subsets of the one or more beam pairs.

In a thirteenth aspect, in combination with one or more of the first aspect through the twelfth aspect, the control information includes a capability index that identifies a quantity of ports available for each beam of the one or more beam pairs.

In a fourteenth aspect, in combination with one or more of the first aspect through the thirteenth aspect, the control information includes signal information for at least a subset of the one or more beam pairs, the signal information including at least one of (i) reference signal received power (RSRP) and (ii) signal interference/noise ratio (SINR).

In a fifteenth aspect, in combination with one or more of the first aspect through the fourteenth aspect, the subset of the one or more beam pairs is selected based on a radio resource control (RRC) configuration.

In a sixteenth aspect, in combination with one or more of the first aspect through the fifteenth aspect, the RRC configuration indicates that signal information is included for beam pairs having each beam of the beam pair capable of receiving data.

In a seventeenth aspect, in combination with one or more of the first aspect through the sixteenth aspect, the RRC configuration indicates that signal information is included for beam pairs that do not have a corresponding capability index, wherein the capability index identifies a quantity of ports available for each beam of corresponding beam pairs.

In an eighteenth aspect, in combination with one or more of the first aspect through the seventeenth aspect, the control information identifies the one or more beam pairs with two or more resource identifiers, wherein the resource identifiers include communication resource indicators (CRIs) and/or synchronization signal block resource indicators (SSBRIs).

In a nineteenth aspect, supporting improved beam reporting with reduced overhead for beam pairs that can both transmit and receive data may include an apparatus configured to execute the processor-readable code to cause the at least one processor to: receive control information from a user equipment device (UE) that identifies one or more beam pairs for use in communicating with the UE; determine one or more beam pairs identified by the control information; determine a first beam pair from among the one or more beam pairs, wherein the first beam pair is capable of both transmitting and receiving data; and communicate with the UE using the first beam pair. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twentieth aspect, in combination with the nineteenth aspect, the control information includes, for at least a subset of the one or more beam pairs, direction indicators that indicate transmitting capabilities for corresponding beam pairs and/or receiving capabilities of corresponding beam pairs.

In a twenty-first aspect, in combination with one or more of the nineteenth aspect through the twentieth aspect, the direction indicators may include a one-bit indicator that identifies between two predetermined transmitting and receiving capabilities.

In a twenty-second aspect, in combination with one or more of the nineteenth aspect through the twenty-first aspect, the direction indicators include a two-bit indicator that identifies between three predetermined transmitting and receiving capabilities.

In a twenty-third aspect, in combination with one or more of the nineteenth aspect through the twenty-second aspect, each of at least a subset of the direction indicators corresponds to individual beam pairs from the one or more beam pairs.

In a twenty-fourth aspect, in combination with one or more of the nineteenth aspect through the twenty-third aspect, each of at least a subset of the direction indicators correspond to multiple beam pairs from the one or more beam pairs.

In a twenty-fifth aspect, in combination with one or more of the nineteenth aspect through the twenty-fourth aspect, the control information includes a capability index that identifies a quantity of ports available for each beam of a predetermined quantity of the one or more beam pairs.

In a twenty-sixth aspect, in combination with one or more of the nineteenth aspect through the twenty-fifth aspect, the control information includes quantities of beam pairs with predetermined transmitting and receiving capabilities, and the beam pairs are identified within the control information in a sequence determined based on the transmitting capabilities and the receiving capabilities.

In a twenty-seventh aspect, in combination with one or more of the nineteenth aspect through the twenty-sixth aspect, the control information is determined based on a first quantity of a first subset of the one or more beam pairs that can both transmit and receive data.

In a twenty-eighth aspect, in combination with one or more of the nineteenth aspect through the twenty-seventh aspect, the control information is determined based on at least one of (i) a second quantity of a second subset of the one or more beam pairs that can only transmit data and/or (ii) a third quantity of a third subset of the one or more beam pairs that can only receive data.

In a twenty-ninth aspect, in combination with one or more of the nineteenth aspect through the twenty-eighth aspect, the first subset of the one or more beam pairs is identified within the control information before either or both of the second subset of the one or more beam pairs and the third subset of the one or more beam pairs.

In a thirtieth aspect, in combination with one or more of the nineteenth aspect through the twenty-ninth aspect, the control information is determined based on the first quantity and the second quantity, and the control information further includes a capability index that identifies a quantity of ports available for each beam of the first and second subsets of the one or more beam pairs.

In a thirty-first aspect, in combination with one or more of the nineteenth aspect through the thirtieth aspect, the control information includes a capability index that identifies a quantity of ports available for each beam of the one or more beam pairs.

In a thirty-second aspect, in combination with one or more of the nineteenth aspect through the thirty-first aspect, the control information includes signal information for at least a subset of the one or more beam pairs, the signal information including at least one of (i) reference signal received power (RSRP) and (ii) signal interference/noise ratio (SINR).

In a thirty-third aspect, in combination with one or more of the nineteenth aspect through the thirty-second aspect, the subset of the one or more beam pairs is selected based on a radio resource control (RRC) configuration.

In a thirty-fourth aspect, in combination with one or more of the nineteenth aspect through the thirty-third aspect, the RRC configuration indicates that signal information is included for beam pairs having each beam of the beam pair capable of receiving data.

In a thirty-fifth aspect, in combination with one or more of the nineteenth aspect through the thirty-fourth aspect, the RRC configuration indicates that signal information is included for beam pairs that do not have a corresponding capability index, wherein the capability index identifies a quantity of ports available for each beam of corresponding beam pairs.

In a thirty-sixth aspect, in combination with one or more of the nineteenth aspect through the thirty-fifth aspect, the control information identifies the one or more beam pairs with two or more resource identifiers, wherein the resource identifiers include communication resource indicators (CRIs) and/or synchronization signal block resource indicators (SSBRIs).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-3 and 7-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:

determining one or more beam pairs available for wireless communication, wherein the one or more beam pairs each include at least two beams capable of transmitting data, receiving data, or both;

determining one or more transmitting capabilities of the one or more beam pairs and one or more receiving capabilities of the one or more beam pairs;

determining, based on the transmitting capabilities and the receiving capabilities, control information that identifies the one or more beam pairs, wherein the control information identifies at least one of the one or more beam pairs as capable of both transmitting and receiving data; and transmitting the control information to a base station.

2. The method of claim 1, wherein the control information includes, for at least a subset of the one or more beam pairs, direction indicators that indicate transmitting capabilities for corresponding beam pairs and/or receiving capabilities of corresponding beam pairs, wherein the direction indicators indicate at least one of corresponding beam pairs capable of transmitting data, corresponding beam pairs capable of receiving data, and corresponding beam pairs capable of both transmitting data and receiving data.

3. The method of claim 2, wherein the direction indicators include a one-bit indicator, wherein a first value of the one-bit indicator identifies a first combination of transmitting capabilities and receiving capabilities and a second value of the one-bit indicator identifies a second combination of transmitting capabilities and receiving capabilities.

4. The method of claim 2, wherein the direction indicators include a two-bit indicator, wherein a first value of the two-bit indicator identifies a first combination of transmitting capabilities and receiving capabilities, a second value of the two-bit indicator identifies a second combination of transmitting capabilities and receiving capabilities, and a third value of the two-bit indicator identifies a third combination of transmitting capabilities and receiving capabilities.

5. The method of claim 2, wherein the one or more beam pairs includes two or more beam pairs, and wherein each of at least a subset of the direction indicators correspond to multiple beam pairs from the two or more beam pairs.

6. The method of claim 2, wherein the control information includes a capability index that identifies a quantity of ports available for each beam of a predetermined quantity of the one or more beam pairs.

7. The method of claim 1, wherein the control information includes quantities of beam pairs with predetermined transmitting and receiving capabilities, and wherein the beam pairs are identified within the control information in a sequence determined based on the transmitting capabilities and the receiving capabilities.

8. The method of claim 7, wherein the control information is determined based on a first quantity of a first subset of the one or more beam pairs that can both transmit and receive data.

9. The method of claim 8, wherein the control information is determined based on at least one of (i) a second quantity of a second subset of the one or more beam pairs that can only transmit data and/or (ii) a third quantity of a third subset of the one or more beam pairs that can only receive data.

10. The method of claim 9, wherein the first subset of the one or more beam pairs is identified within the control information before either or both of the second subset of the one or more beam pairs and the third subset of the one or more beam pairs.

11. The method of claim 9, wherein the control information is determined based on the first quantity and the second quantity, and wherein the control information further includes a capability index that identifies a quantity of ports available for each beam of the first and second subsets of the one or more beam pairs.

12. The method of claim 1, wherein the control information includes signal information for at least a subset of the one or more beam pairs, the signal information including at least one of (i) reference signal received power (RSRP) and (ii) signal interference/noise ratio (SINR).

13. A method of wireless communication performed by a base station, the method comprising:

receiving control information from a user equipment device (UE) that identifies one or more beam pairs for use in communicating with the UE;

determining one or more beam pairs identified by the control information;

determining a first beam pair from among the one or more beam pairs, wherein the first beam pair is capable of both transmitting and receiving data; and communicating with the UE using the first beam pair.

14. The method of claim 13, wherein the control information includes, for at least a subset of the one or more beam pairs, direction indicators that indicate transmitting capabilities for corresponding beam pairs and/or receiving capabilities of corresponding beam pairs, wherein the direction indicators indicate at least one of corresponding beam pairs capable of transmitting data, corresponding beam pairs capable of receiving data, and corresponding beam pairs capable of both transmitting data and receiving data.

15. The method of claim 14, wherein the direction indicators may include a one-bit indicator, wherein a first value of the one-bit indicator identifies a first combination of transmitting capabilities and receiving capabilities and a second value of the one-bit indicator identifies a second combination of transmitting capabilities and receiving capabilities.

16. The method of claim 14, wherein the direction indicators include a two-bit indicator, wherein a first value of the two-bit indicator identifies a first combination of transmitting capabilities and receiving capabilities, a second value of the two-bit indicator identifies a second combination of transmitting capabilities and receiving capabilities, and a third value of the two-bit indicator identifies a third combination of transmitting capabilities and receiving capabilities.

17. The method of claim 14, wherein the one or more beam pairs includes two or more beam pairs, and wherein each of at least a subset of the direction indicators correspond to multiple beam pairs from the two or more beam pairs.

18. The method of claim 14, wherein the control information includes a capability index that identifies a quantity of ports available for each beam of a predetermined quantity of the one or more beam pairs.

19. The method of claim 13, wherein the control information includes quantities of beam pairs with predetermined transmitting capabilities and predetermined receiving capabilities, and wherein the beam pairs are identified within the control information in a sequence determined based on the predetermined transmitting capabilities and the predetermined receiving capabilities.

20. The method of claim 19, wherein the control information is determined based on a first quantity of a first subset of the one or more beam pairs that can both transmit and receive data.

21. The method of claim 20, wherein the control information is determined based on at least one of (i) a second quantity of a second subset of the one or more beam pairs that can only transmit data and/or (ii) a third quantity of a third subset of the one or more beam pairs that can only receive data.

22. The method of claim 21, wherein the first subset of the one or more beam pairs is identified within the control information before either or both of the second subset of the one or more beam pairs and the third subset of the one or more beam pairs.

23. The method of claim 21, wherein the control information is determined based on the first quantity and the second quantity, and wherein the control information further includes a capability index that identifies a quantity of ports available for each beam of the first and second subsets of the one or more beam pairs.

24. The method of claim 13, wherein the control information includes signal information for at least a subset of the one or more beam pairs, the signal information including at least one of (i) reference signal received power (RSRP) and (ii) signal interference/noise ratio (SINR).

25. A user equipment (UE) comprising:

a memory storing processor-readable code; and at least one processor coupled to the memory, the at least one processor configured to execute the processor-readable code to cause the at least one processor to:

determine one or more beam pairs available for wireless communication by the UE;

determine one or more transmitting capabilities of the one or more beam pairs and one or more receiving capabilities of the one or more beam pairs;

determine, based on the transmitting capabilities and the receiving capabilities, control information that identifies the one or more beam pairs, wherein the control information identifies at least one of the one or more beam pairs as capable of both transmitting and receiving data; and transmit the control information to a base station.

26. The UE of claim 25, wherein the control information includes, for at least a subset of the one or more beam pairs, direction indicators that indicate transmitting capabilities for corresponding beam pairs and/or receiving capabilities of corresponding beam pairs, wherein the direction indicators indicate at least one of corresponding beam pairs capable of transmitting data, corresponding beam pairs capable of receiving data, and corresponding beam pairs capable of both transmitting data and receiving data.

27. The UE of claim 25, wherein the control information includes quantities of beam pairs with predetermined transmitting and receiving capabilities, and wherein the beam pairs are identified within the control information in a sequence determined based on the transmitting capabilities and the receiving capabilities.

28. A base station comprising:

a memory storing processor-readable code; and at least one processor coupled to the memory, the at least one processor configured to execute the processor-readable code to cause the at least one processor to:

receive control information from a user equipment device (UE) that identifies one or more beam pairs for use in communicating with the UE;

determine one or more beam pairs identified by the control information;

determine a first beam pair from among the one or more beam pairs, wherein the first beam pair is capable of both transmitting and receiving data; and communicate with the UE using the first beam pair.

29. The base station of claim 28, wherein the control information includes, for at least a subset of the one or more beam pairs, direction indicators that indicate transmitting capabilities for corresponding beam pairs and/or receiving capabilities of corresponding beam pairs, wherein the direction indicators indicate at least one of corresponding beam pairs capable of transmitting data, corresponding beam pairs capable of receiving data, and corresponding beam pairs capable of both transmitting data and receiving data.

30. The base station of claim 28, wherein the control information includes quantities of beam pairs with predetermined transmitting capabilities and predetermined receiving capabilities, and wherein the beam pairs are identified within the control information in a sequence determined based on the predetermined transmitting capabilities and the predetermined receiving capabilities.

* * * * *